Patented Apr. 12, 1938

2,113,570

UNITED STATES PATENT OFFICE 2,113,570

PROCESS FOR UTILIZING EDIBLE MATERIALS

Hans F. Bauer, Chicago, Ill., assignor to Stein, Hall Manufacturing Company, Chicago, Ill., a corporation of Delaware No Drawing. Application August 17, 1933, Serial No. 685,637

3 Claims. (Cl. 99—93)

My invention relates to methods for making edible products in which a flour is used. Such products may be either of a yeast leavened or chemically aerated nature similar to breads, cakes, biscuits and other like substances. More particularly, my invention relates to processes for making edible products comprising the treatment of a gluten-containing flour used as a component of such edible products for the purpose of so modifying the gluten content as to facilitate or expedite the subsequent steps in the process of manufacture.

Previously there have been several disadvantages in the utilization of gluten-containing flours, particularly in making edible products. These disadvantages have been found to be inherent in the characteristic of flour itself inasmuch as such disadvantages may be traced back to the relative toughness or lack of tensibility of the dough when formed from gluten-containing flours. That this characteristic toughness of the dough so formed from ordinary flours is one of primary influence in the making of such products can be appreciated when it is realized that the porosity essential to the final product is due to the formation or expansion of gas within the dough or batter generated by a leavening agent such as yeast or a chemical aerating agent such as baking powder. The dough if it is tough and relatively non-tensible is more resistant to an increase in porosity inasmuch as the gases generated within the material are restrained from expanding. There is also the related disadvantage that the toughness of the dough or batter tends to allow an uneven expansion of the gases with resulting uneven porosity in the final product.

Previously the only methods available to overcome these disadvantages had been to carry on a considerable working of the dough or batter to obtain an even distribution of the gases and to allow a long period of time for their generation and expansion. In using certain agents for increasing the porosity of the dough, for example, yeast, there may be brought into operation after a period of time a mellowing action upon the gluten but this condition only arises, as already stated, after a considerable period of time has elapsed and only by a careful control of the operating conditions and proper working of the dough.

There are other attendant disadvantages which derive from the same source. Due to the fact that previously a relatively long period of processing has been necessary in obtaining a dough or batter of desirable properties, there takes place a chemical deterioration of the flour, which deterioration may result in compounds being formed which have an unpleasant or at least negative taste. Also there has been a considerable loss of reaction products during these operations, some of which result in diminishing the ultimate yield from a given amount of starting materials and which also results in losses of desirable constituents from the final product. This is particularly true in connection with the loss of the fermentation products resulting in making a leavened dough with yeast.

I have found that by the addition of minute amounts of certain chemicals or certain chemically prepared products to a flour, or by previous treatment of the flour itself with these chemicals, it is possible to so mellow, soften, or condition the gluten content of the flour, that the above recited inherent disadvantages of the flour are overcome. By means of my treatment the extensibility and the resiliency of a dough or batter can be tremendously increased so that a rapid formation of porosity in the dough and one of a uniform nature can be obtained in making edible products using for example a leavening agent such as yeast or chemically aerating materials. Furthermore, the rapidity of the aerating steps can be so increased that the material is ready for baking without any substantial deterioration of the components or losses.

I am able, therefore, to rapidly produce edible products without the necessity of extended working, which products have a uniform porosity and furthermore which have highly desirable characteristics in view of the fact that they have in them components which have previously been lost or which have deteriorated during the dough-forming operations. The products so formed are also free from unpleasant tasting constituents or at least constituents having no taste with the result that the true flavors of the various flours used are brought out. A flour so treated when mixed with water to form a dough or batter will form a dough which is more mellow, more tensible and more capable of being thoroughly and more uniformly aerated than it is possible to obtain in making a dough from ordinary untreated flour.

The chemicals which I have found to be suitable in treating the gluten-containing flour prior to the dough-forming operation or to add to a flour or to the dough itself are, to enumerate a few, sulphur dioxide, sulphurous acid, sodium bisulphite, sodium meta-bisulphite, sodium pyrosulphite, sodium hydrosulphite and its organic addition compounds with aldehydes and ketones, sodium sulphite, sodium formaldehyde sulphoxylate, hydrogen sulphide, sodium sulphide, ammonium polysulphide, sodium xanthate, potassium ethyl xanthate, urea, sodium diethyl dithio carbonate, thio cresol, thionaphthol, and sodium trithio-carbonate. Other similar and related compounds having gluten modifying or liquefying properties may also be used to accomplish my results.

I have found that by the addition of relatively small amounts of the above-mentioned chemicals to a flour or to a flour dough, the gluten is softened and made more tensible although not necessarily liquefied. Either all or a portion of the flours to be used in making up the dough or batter may be treated or if desired the flour may be modified by adding the substance by means of a carrier agent, for example, by treating a flour or some other suitable substance in such manner that the modifying constituents of these chemicals are present therein and upon addition to the flour to be used in the dough or upon addition to the dough, I have found that the desired mellowing of the gluten is obtained and that a dough of soft extensible nature is obtained.

In the making of a product, for example, of the type of bread, there are two general methods used for the preparation of a dough in which yeast is used as the leavening agent. These two methods are namely, sponge dough method and straight dough method. In the sponge dough method the yeast is mixed with a part of the flour and allowed to ferment before the balance of the dough is added to it, whereas in the straight dough, the entire batch of dough is made up and allowed to ferment. After the complete dough batch has been made, the methods used in further processing have been substantially the same and are familiar to those skilled in the art. These subsequent steps consist primarily in allowing the ferment to act within the dough, separating the dough into desired units and baking them. However, the difficulties of carrying out these operations previously have been considerable and have necessitated a number of intermediate operations with considerable pounding and working of the dough and a great amount of handling from one machine to another. This procedure has furthermore necessitated considerable special equipment.

One of the primary reasons for the necessity of all of the prior processing which was formerly believed to be necessary in making a bread type of product from a dough fermented with yeast has been the toughness or non-tensibility of the dough. The previous processing steps were carried out to overcome this difficulty and to soften the dough by the working and fermenting action which eventually brought about an extensibility which permitted the production of a product which approached one of uniform porosity.

In the making of products from a batter utilizing a chemical aerating agent, the same difficulties have arisen, and in order to obtain satisfactory results, it was necessary to use sufficient gas forming aerating components to overcome the relative toughness of the batter due to the gluten constituents of the flour used.

By means of my method I am able to so soften the gluten constituents of a flour used, either by preliminary treatment or after its mixture into a dough, that the disadvantages enumerated above, due to the tough and non-tensible character of the dough, are avoided and a soft extensible readily resilient dough is obtained which permits a quick and rapid processing and the formation of edible products which are unique in both physical and chemical characteristics. The amount of gluten modifying characteristics of the type enumerated above which I utilize in carrying out my process is so small, and furthermore is usually eliminated from the dough or edible product during subsequent processing operations that they are substantially undetectable in the final products. Should, however, any of these chemical components be found to be present, the amount would be so small as to have no effect upon the human system, and are well within the limits allowed by the pure food laws.

The dough softening operations in making edible products I have found can be carried out satisfactorily in several different ways. I may, for example, blend a small amount of one or more of the gluten modifying substances of the type enumerated above with a flour to be used in making up the dough or batter. Such mixed flour is then made into the dough or batter, and upon wetting, mixing and working of the same, the modifying or mellowing effect comes into effective action upon the gluten of the flour and a soft, extensible and easily workable dough or batter is obtained. The subsequent operations in using such a modified dough or batter may be the same as those which are usually carried out by persons skilled in the baking art. If desired, only a portion of the flour to be used may be so treated by mixture with the gluten modifying agents, and such treated portion may be mixed with the untreated flour in making up the dough. Due to the fact that the effectiveness of the various gluten modifying chemicals mentioned vary to quite an extent and also the gluten content of flours, and that it is desirable to use a minimum quantity of such gluten modifying agents so that their presence will not affect the product in such a way as to make it undesirable for food purposes, I use in the preferred form of my process sulphur dioxide or sodium bisulphite to accomplish my purpose. These last mentioned chemicals are generally effective in producing the desired effect on the dough when used in quantities of less than .00075 per cent to the total amount of flour used.

An effective application of my method of mellowing the gluten content of flours from the standpoint of the flour miller, would be to treat a flour in the dry state with a sufficient amount of gaseous sulphur dioxide to obtain the desired degree of softening action on the gluten, and subsequently heat or agitate the treated flour to a degree sufficient to drive off any non-absorbed sulphur dioxide that might remain in a free state. This modified flour may then be used as described above, or, if desired, a portion of such modified or treated flour sufficient to obtain the desired degree of mellowing action, may be mixed with untreated flour in making up a dough. I have found, for example, that by the treatment of 5000 parts of wheat flour in the dry state with one part by weight of gaseous sulphur dioxide and subsequently agitating the flour for one hour at a temperature of 230° F. to remove any non-absorbed sulphur dioxide, I can obtain a modified flour product which, when added in proportions of from 1 to 7% to an untreated flour, will mellow the gluten of that flour to a degree suitable for my purposes. The exact percentage or proportion of this treated flour product to be added to the untreated flour depends on the type of flour used, and the purpose for which it is to be applied. As a general rule, it is desirable for best results to use a greater percentage of the modified flour product in conjunction with clear or long patent flours of high gluten content than would be necessary with extra short patent flours of lower and softer gluten content.

In this connection I have also found it effective to treat a portion of some protein containing vegetable flour, such as soy bean flour, pea flour, potato flour, and other similar flours with sulphur dioxide, and subsequently heating and agitating to remove any remaining free sulphur dioxide. Such a conditioned vegetable flour may then be mixed with a wheat floor, for example, in the proportions of 1 to 7 parts treated vegetable flour to 100 parts of wheat flour in producing a desirable extensible dough.

Another preferred method of applying my invention for the purpose of mellowing the gluten content of flour would be to blend for example, 1 lb. of sodium bisulphite, with 1000 lbs. of a material of the nature of wheat flour, rye flour, corn flour, starch, or similar materials, and then acidify the mixture with an excess of hydrochloric or similar acid required to react with the sulphite salt present. Sulphur dioxide and the salt corresponding to the acid used are the products of the reaction. Subsequently, the mixture is heated in a dextrine converting drum until any non-absorbed sulphur dioxide is driven off, and the starch components of the material are partially dextrinized. The final product obtained in this way is then added to the main portion of the flour to be used in preparing the dough or batter, the proportions depending upon the degree of gluten modification desired. For bread doughs, for example, I have found the most desirable proportions in utilizing this modified product as 1 to 7% of modified product to the total weight of the flour used.

In my copending applications Serial No. 552,996 and Serial No. 566,161, now issued as Patents Nos. 1,969,347 and 1,938,574 respectively, I have described in detail the method for obtaining products similar to those just described. These products called "protamylin" I have found to be particularly efficacious in carrying out my process for mellowing the gluten content of flours so they will be more suitable for baking purposes.

One of the very noticeable effects obtained through the use of my invention is the reduction of mixing time. If, for example, a baker finds it necessary to mix a certain flour 15 minutes in order to obtain a smooth dough, he will find that on the addition of a small amount of one of the above mentioned chemicals or products to the same flour, the necessary mixing time required to obtain a smooth silky dough will be reduced to possibly 9 or 10 minutes, the amount of reduction depending on the proportion of the modifying agent added.

By means of my process I am able to considerably cut down the amount of time necessary to form a dough or batter and simultaneously eliminate many of the operations which have previously been necessary. The dough which I form is of such a soft and extensible nature that it rises rapidly. Also I am able to obtain a final product which has a uniform and even porosity of fine multi-cellular characteristics. I am also able to obtain products which have not changed in natural flavors of the cereal materials originally added. By means of the operation of conditioning, softening or mellowing the gluten content of the flours used, either in yeast leavened or in chemical aerated food products, the flour is therefore made capable of a thorough and more uniform aeration and made up into a dough in a relatively short period of time as compared with previous operations. As already pointed out, the operation of so modifying the gluten content as to soften and make it more extensible or otherwise condition it may be carried out either by the direct addition of one or more chemicals of the type enumerated above to the flour or dough, or by the indirect addition of such chemicals through the means of dry carriers or liquid media. Also the operation may be carried out by a preliminary treatment of either the material or a portion of it or some suitable flour subsequently to be added to the flour or dough.

While I have enumerated several specific methods for carrying out my process, such examples are for the purposes of illustration only, and I do not wish to be limited to such disclosure or such specific methods of procedure. It may be apparent to those skilled in the art that there are other methods for carrying out my process, and I wish, therefore, to be limited only by the prior art and the appended claims.

I claim:

1. The process for treating a gluten containing flour to obtain a modified product suitable for use in making edible substances, comprising blending not over 1% of a sulphite salt with a portion of said flour, acidifying the mixture with an excess of acid, heating the mixture to remove any resulting non-absorbed sulphur dioxide partially dextrinizing the starchy components of said portion of flour, and adding from 1% to 7% of the thus treated portion of flour to the untreated portion of gluten containing flour.

2. The process of preparing a modified flour suitable for use in making edible substances, comprising adding not over 1% of a sulphite salt to a gluten containing flour to modify the gluten content thereof, adding an excess of acid to react with said sulphite salt, heating said mixture to remove any resulting non-absorbed sulphur dioxide, and to partially dextrinize the starchy components of said flour, and mixing 1 to 7% by weight of said treated flour with the untreated flour.

3. The process for treating a gluten containing flour to modify the gluten content and render the flour suitable for use in making bakery products, comprising treating the flour with a small amount of a member of the group consisting of sulphur dioxide, sulphurous acid, sodium bisulphite, sodium meta-bisulphite, sodium pyrosulphite, sodium hydrosulphite, organic addition compounds of sodium hydrosulphite with aldehydes and ketones, and sodium sulphite, the compound being employed in an amount sufficient to soften the gluten, but insufficient to disperse the gluten, said amount of said compound being not more than an amount equivalent in sulphur dioxide content to the sulphur dioxide content in 1% of a sulphite salt, then mixing said treated flour with untreated flour in the proportions of approximately 1 to 7% of the treated flour, dependent upon the degree of gluten modification desired.

HANS F. BAUER.